July 24, 1928.  1,678,036
C. H. DESAUTELS
APPARATUS FOR CUTTING RUBBER SHEETS
Filed April 19, 1926   2 Sheets-Sheet 1
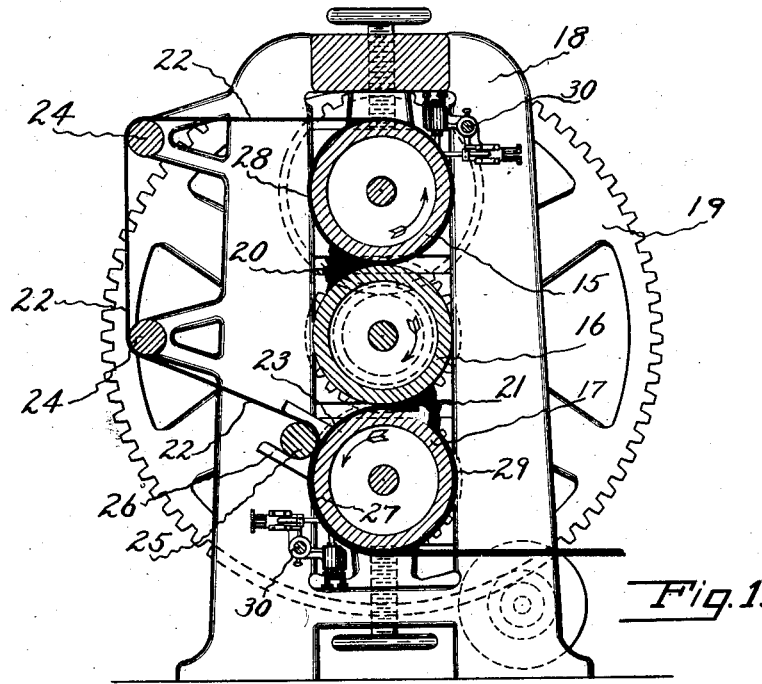
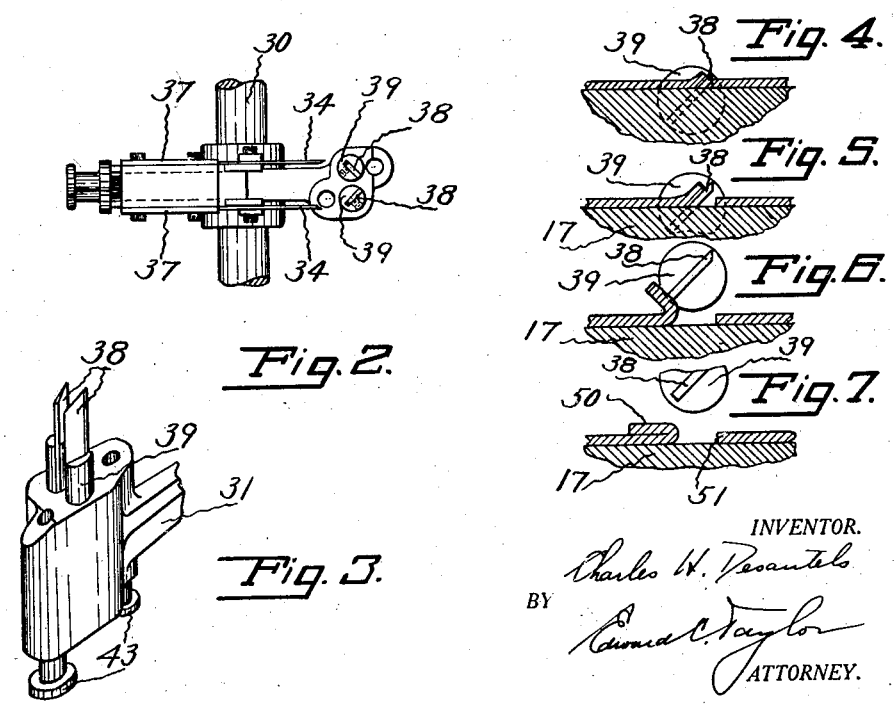
INVENTOR.
Charles H. Desautels
BY
Edward C. Taylor
ATTORNEY.

July 24, 1928.
C. H. DESAUTELS
1,678,036
APPARATUS FOR CUTTING RUBBER SHEETS
Filed April 19, 1926  2 Sheets-Sheet 2
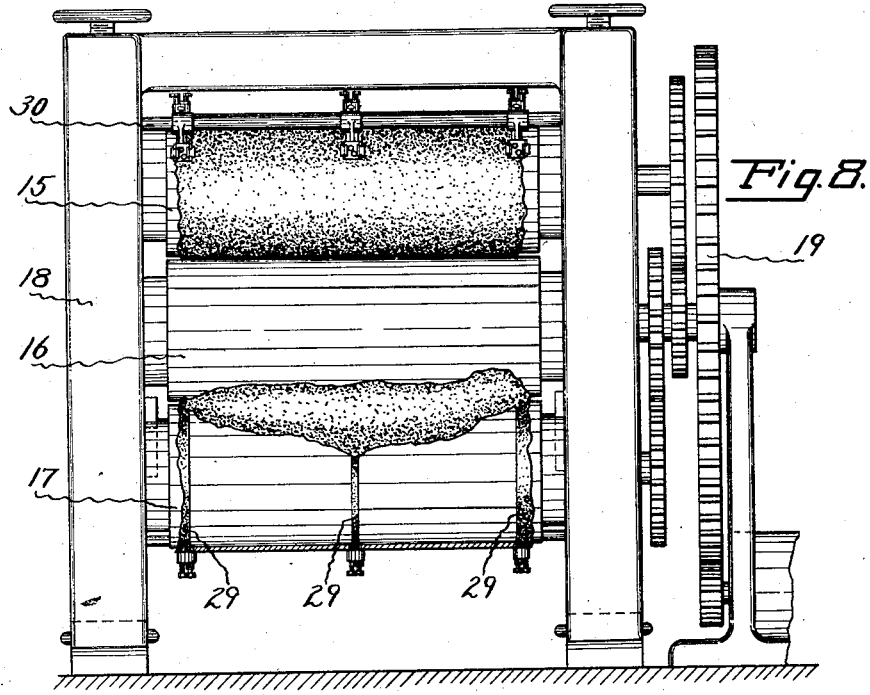
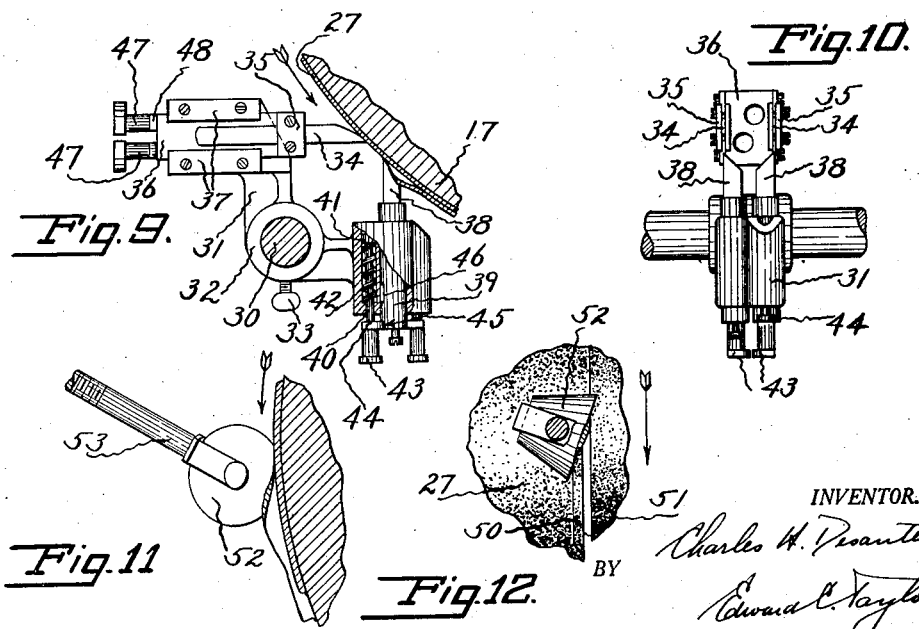
INVENTOR.
Charles H. Desautels
BY
Edward C. Taylor
ATTORNEY.

Patented July 24, 1928.

1,678,036

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

APPARATUS FOR CUTTING RUBBER SHEETS.

Application filed April 19, 1926. Serial No. 102,930.

This invention relates to an apparatus for cutting rubber sheets. It has particular reference to apparatus for trimming the edges of a continuous rubber sheet as the latter is being delivered upon the surface of a roll, as for example a roll of the calender upon which the stock is being formed. The object of the invention is to provide an apparatus by which such sheets may be cut cleanly and accurately, and without sticking of the marginal portions of the adhesive rubber to the edges of the trimmed sheet.

Referring to the drawings,

Fig. 1 is a vertical section through a calender upon which my invention is applied;

Fig. 2 is a top plan view of a cutting device shown in Fig. 1;

Fig. 3 is a perspective view of the parts shown in Fig. 2, looking from the upper right hand corner in the latter figure;

Figs. 4, 5, 6 and 7 are detail views on an enlarged scale illustrative of the action of the margin turning apparatus;

Fig. 8 is a front elevation of the calender, looking from the right in Fig. 1;

Fig. 9 is an enlarged side elevation of the parts shown in Fig. 1;

Fig. 10 is an elevation of the parts shown in Fig. 9, looking from the right in the latter figure; and Figs. 11 and 12 are respectively side and front elevations of a modification.

The invention has been shown as applied to a three roll calender adapted in accordance with the Hanna Patent 1,289,744 for the production of two-ply rubber stock. It is equally applicable, however, to calenders of other types, the one chosen being as an illustration only. The calender comprises stacked rolls 15, 16 and 17 supported in a suitable frame 18 and driven by gearing 19. Feeds of rubber 20 and 21 are sheeted out by the rolls to form webs of rubber 22 and 23 respectively. The web 22 is guided around rollers 24 to a pressure roller 25 mounted in slides 26 so as to press the web 22 against the web 23 to form a two-ply web 27. In the operation of a calender of this type it is necessary to cut the web 22 and also the web 23 on their respective supporting rollers 15 and 17 so that the compound web may be of the size desired, the two webs being of the same or of different widths. The usual form of cutting device employed for this purpose is a knife bearing directly upon the surface of the calender roll, the marginal portions of the stock passing around the roll as at 28 and 29 to join the sheet of rubber. It has been found that a cut produced in this manner will generally not be even on the edges due to the re-uniting of the body of the sheet with the marginal portions after the cut was made.

By my invention I have produced an apparatus by which the marginal portions are removed from possibility of contact with the body of the cut web, and have also improved the manner of mounting the cutter members themselves. Extending across the calender between the end frames 18 are rods 30 supporting as many cutting units as desired. In Fig. 8 three cutting units are shown upon a rod 30 adjacent the upper roll 15, and a similar number are shown on a rod 30 adjacent the lower roll 17. All of these units are similar and a description of one will suffice.

Each unit comprises a body portion 31 having a hub 32 clamped by a set screw 33 or other suitable adjustable means to the rod 30. In the case shown each unit carries a pair of knives 34, the use of a pair being desirable in order to form a pair of webs side by side with a space between them as shown in Fig. 8. Provision is made, as will be described later, for moving either one of the knives out of operative position when its use is not necessary. Each knife is mounted by a clamp 35 upon a slide 36 carried in ways 37 upon the body portion 31. At right angles to the knives are mounted margin turning members or plows 38 which are carried in plungers 39 mounted side by side on an enlarged portion of the body. Mounted beside each of the plungers 39 are rods 40 having enlarged heads 41 and held by springs 42 so as to be constantly strained towards the calender roll. Each rod has a head or handle 43 and an eccentric ledge 44 adapted to fit either into a shoulder 45 or into a notch 46 in the adjacent one of the plungers 39. When the ledge is engaged in the shoulder 45 the plow 38 will be forced by the spring 42 yieldingly against the surface of roll 17. If the handle 43 is rotated so as to turn the eccentric ledge 44 out of contact with the shoulder, the plungers may be retracted and the ledge then re-engaged with the notch 46 to hold the plow in an inoperative position.

A similar mounting is provided for the knives 34, plungers 47 being provided with ledges 48 engaging either the ends of the slides 36 or grooves on their inner surfaces. The grooves do not appear in the drawings, being covered by other parts, but are in the same relative position on the slide as notches 46 are on the plungers 39. This construction serves to press the knives or plows against the calender roll with an elastic pressure, but also provides a method by which any individual knife or plow may be held in an inactive position by a very simple manipulation.

In operation the knife 34 severs the sheet 27 on the roll 17 and immediately thereafter the plow 38 enters the insertion thus made and turns back upon itself the edge of the marginal portion adjacent the cut. This operation is shown progressively in Figs. 4 to 7, these views being longitudinal sections through a portion of the calender roll during its passage over one of the folders. After the position of Fig. 6 has been reached, the elastic nature of the rubber will cause the marginal portion 50 to turn completely back on itself without the necessity of its being positively forced into this position. As is clearly seen from Fig. 7, the cut edge 51 of the sheet is thus left free from any possibility of contact with the trimmed off margin.

Instead of using plows to bear against the surface of the calender roll and turn over the edge of the marginal portions, I have found that it is possible to accomplish the same result by a different arrangement. In this modification (Figs. 11 and 12) I employ a roll 52 mounted upon a suitable support 53 so that its axis is at an angle to the axis of the roll 17. I find that the best results will be secured if the roll 52 is of frusto-conical form as indicated in Fig. 12. The roll is set to contact with the outer surface of the rubber sheet at the marginal side of the cut made by the knife 34, and is left free to be rotated by the friction of the stock. Due to the stresses set up in the edges of the marginal portions of the stock by this roll I have found that the marginal portions will turn over as indicated in Figs. 11 and 12 after passing under these rolls and without the necessity of any plow entering under them. The action is decidedly peculiar as it apparently is in the exact opposite of the direction of the force exerted by the roll.

Having thus described my invention, I claim:

1. In combination, a roll for supporting a rubber sheet, means for cutting the sheet, and means for turning back upon itself the marginal portions of the sheet.

2. In combination, a roll for supporting a rubber sheet, means for cutting the sheet, and an angularly arranged turning device adapted to engage the marginal portions of the sheet and fold it back upon itself.

3. In combination, a roll for supporting a rubber sheet, a pair of adjacent knives for cutting the sheet along lines circumferentially of the roll, and a pair of turning devices operable to turn back upon itself the edge portions of the strip of rubber lying between the knives.

4. In combination, a roll for supporting a rubber sheet, means for cutting the sheet along lines circumferentially of the roll, and a device frictionally engaging the outer surface of the marginal portion of said sheet to cause the edge of this marginal portion to fold over upon itself.

5. In combination, a roll for supporting a rubber sheet, means for cutting said sheet along a line circumferentially of the roll, and a frusto-conical roll having its large end frictionally engaging the stock at a point adjacent the cut end having its axis set at an angle to the axis of the roll whereby a portion of the stock will be caused to fold over upon itself leaving one cut edge free of contact with other rubber surfaces.

6. In combination, a roll for supporting a rubber sheet and a knife holder comprising a supporting slide, spring pressed plungers mounted adjacent the slide, knives carried by the slide, and means for causing the plungers to engage the slide either to press the knife into operative position against the roll or to hold it in inoperative position.

CHARLES H. DESAUTELS.